US008948365B2

(12) United States Patent
Ricci (10) Patent No.: US 8,948,365 B2
(45) Date of Patent: *Feb. 3, 2015

(54) SYSTEMS AND METHODS FOR PROVIDING ANSWERING SERVICES

(71) Applicant: New I.P. Investments, LLC, Saint Louis, MO (US)

(72) Inventor: Francesco Ricci, Santarcangelo (IT)

(*) Notice: Subject to any disclaimer, the term of this patent is extended or adjusted under 35 U.S.C. 154(b) by 0 days.

This patent is subject to a terminal disclaimer.

(21) Appl. No.: 14/215,672

(22) Filed: Mar. 17, 2014

(65) Prior Publication Data

US 2014/0198906 A1 Jul. 17, 2014

Related U.S. Application Data

(63) Continuation of application No. 12/373,022, filed as application No. PCT/US2007/015652 on Jul. 9, 2007, now Pat. No. 8,718,257, which is a continuation-in-part of application No. 11/652,319, filed on Jan. 11, 2007, now abandoned, which is a continuation of application No. PCT/US2006/026790, filed on Jul. 10, 2006.

(51) Int. Cl.
*H04M 3/42* (2006.01)
*H04M 3/54* (2006.01)
(Continued)

(52) U.S. Cl.
CPC ............ *H04M 3/54* (2013.01); *H04M 3/42102* (2013.01); *H04M 3/42314* (2013.01); *H04M 3/51* (2013.01); *H04M 7/123* (2013.01)
USPC .................. 379/211.01; 379/211.02

(58) Field of Classification Search
CPC ......... H04M 3/54; H04M 3/436; H04M 3/58; H04M 3/42153; H04M 2242/22; H04M 2203/2011; H04M 7/006; H04L 65/1096; H04W 4/16

USPC ................ 379/70, 201.01, 207.08, 379/211.01–211.02, 214.01, 212.01
See application file for complete search history.

(56) References Cited

U.S. PATENT DOCUMENTS 4,117,270 A 9/1978 Lesea
4,764,919 A 8/1988 Hunter et al.
(Continued)

FOREIGN PATENT DOCUMENTS

EP 1283635 2/2003
JP 5219217 A 8/1993
(Continued)

OTHER PUBLICATIONS

PCT International Search Report for PCT/US06/26790 dated Mar. 29, 2007.
(Continued)

*Primary Examiner* — Rasha Al Aubaidi
(74) *Attorney, Agent, or Firm* — Bryan Cave LLP (57) ABSTRACT

The present invention includes a method and system for the management and routing of telecommunications information on data and telephone lines. In one exemplary embodiment in accordance with the present invention, a flexible system whereby business information is correlated to a user's telephone number is provided. In another exemplary embodiment, the present invention provides an on-line answering service in which the identification information of the called party can be maintained during call forwarding and/or diversion. In another exemplary embodiment, the identification information of the user called can be detected by the answering system. In addition, in another exemplary embodiment, the present invention provides answering services access to information about the called party as well as the calling party in order to facilitate the answering services' responses on behalf of their users.

20 Claims, 7 Drawing Sheets

(51) Int. Cl.
*H04M 3/51* (2006.01)
*H04M 7/12* (2006.01)

(56) References Cited

U.S. PATENT DOCUMENTS

| | | | |
|---|---|---|---|
| 5,023,868 A | 6/1991 | Davidson et al. | |
| 5,237,604 A | 8/1993 | Ryan | |
| 5,249,221 A | 9/1993 | Ketring | |
| 5,369,695 A | 11/1994 | Chakravarti et al. | |
| 5,408,528 A | 4/1995 | Carlson et al. | |
| 5,467,391 A | 11/1995 | Donaghue, Jr. et al. | |
| 5,550,911 A | 8/1996 | Bhagat et al. | |
| 5,642,411 A | 6/1997 | Theis | |
| 5,790,180 A | 8/1998 | Wild | |
| 5,805,688 A | 9/1998 | Gillespie et al. | |
| 5,818,919 A | 10/1998 | Berberich, Jr. et al. | |
| 5,838,779 A | 11/1998 | Fuller et al. | |
| 5,867,494 A | 2/1999 | Krishnaswamy et al. | |
| 5,867,495 A | 2/1999 | Elliott et al. | |
| 5,889,846 A | 3/1999 | Ricciardi | |
| 5,907,549 A | 5/1999 | Nagao | |
| 5,917,817 A | 6/1999 | Dunn et al. | |
| 5,974,131 A | 10/1999 | Malik | |
| 5,999,525 A | 12/1999 | Krishnaswamy et al. | |
| 5,999,612 A | 12/1999 | Dunn et al. | |
| 6,002,689 A | 12/1999 | Christie et al. | |
| 6,014,378 A | 1/2000 | Christie et al. | |
| 6,018,575 A | 1/2000 | Gross et al. | |
| 6,125,126 A | 9/2000 | Hallenstal | |
| 6,141,413 A | 10/2000 | Waldner et al. | |
| 6,144,723 A | 11/2000 | Truchon et al. | |
| 6,148,070 A | 11/2000 | Meek et al. | |
| 6,163,606 A | 12/2000 | Otto | |
| 6,172,977 B1 | 1/2001 | Christie et al. | |
| 6,181,703 B1 | 1/2001 | Christie et al. | |
| 6,262,992 B1 | 7/2001 | Nelson et al. | |
| 6,282,279 B1 | 8/2001 | Ricciardi | |
| 6,301,349 B1 | 10/2001 | Malik | |
| 6,311,073 B1 | 10/2001 | Charpentier et al. | |
| 6,335,927 B1 | 1/2002 | Elliott et al. | |
| 6,353,611 B1 | 3/2002 | Norris et al. | |
| 6,393,017 B1 | 5/2002 | Galvin et al. | |
| 6,393,278 B1 | 5/2002 | Buchanan et al. | |
| 6,430,195 B1 | 8/2002 | Christie et al. | |
| 6,434,385 B1 | 8/2002 | Aucoeur | |
| 6,466,654 B1 | 10/2002 | Cooper et al. | |
| 6,493,696 B1 | 12/2002 | Chazin | |
| 6,535,730 B1 | 3/2003 | Chow et al. | |
| 6,535,855 B1 | 3/2003 | Cahill et al. | |
| 6,564,321 B2 | 5/2003 | Bobo, II | |
| 6,587,555 B1 | 7/2003 | Cripe et al. | |
| 6,587,683 B1 | 7/2003 | Chow et al. | |
| 6,606,744 B1 | 8/2003 | Mikurak | |
| 6,618,600 B1 | 9/2003 | Chow et al. | |
| 6,647,107 B1 | 11/2003 | Horrer | |
| 6,654,615 B1 | 11/2003 | Chow et al. | |
| 6,671,818 B1 | 12/2003 | Mikurak | |
| 6,674,840 B1 | 1/2004 | Contractor | |
| 6,704,327 B1 | 3/2004 | Gardner et al. | |
| 6,728,543 B2 | 4/2004 | Immonen et al. | |
| 6,731,625 B1 | 5/2004 | Eastep et al. | |
| 6,738,466 B1 | 5/2004 | LaPierre et al. | |
| 6,745,025 B1 | 6/2004 | Chow et al. | |
| 6,751,299 B1 | 6/2004 | Brown et al. | |
| 6,754,181 B1 | 6/2004 | Elliott et al. | |
| 6,757,362 B1 | 6/2004 | Cooper et al. | |
| 6,771,762 B1 | 8/2004 | Chang et al. | |
| 6,771,953 B1 | 8/2004 | Chow et al. | |
| 6,771,959 B1 | 8/2004 | Tiainen | |
| 6,785,560 B1 | 8/2004 | Chow et al. | |
| 6,819,945 B1 | 11/2004 | Chow et al. | |
| 6,839,409 B1 | 1/2005 | Keusch et al. | |
| 6,947,571 B1 | 9/2005 | Rhoads et al. | |
| 6,950,507 B1 | 9/2005 | Kaplan | |
| 6,970,546 B2 | 11/2005 | Kent, Jr. et al. | |
| 7,027,463 B2 | 4/2006 | Mathew et al. | |
| 7,054,428 B1 | 5/2006 | Berthoud et al. | |
| 7,062,027 B2 | 6/2006 | Oikawa et al. | |
| 7,440,421 B2 | 10/2008 | Abramson et al. | |
| 2001/0012352 A1 | 8/2001 | Morgan | |
| 2002/0187787 A1 | 12/2002 | Fry | |
| 2005/0117731 A1 | 6/2005 | Pearson | |
| 2012/0005200 A1 | 1/2012 | Lawrence | |

FOREIGN PATENT DOCUMENTS

| | | |
|---|---|---|
| JP | 06197164 A | 7/1994 |
| JP | 08-056255 | 2/1996 |
| JP | 2002-118664 | 4/2002 |
| JP | 2004-088651 | 3/2004 |
| JP | 2004-235778 | 8/2004 |
| WO | 92/16067 | 9/1992 |

OTHER PUBLICATIONS

PCT International Search Report for PCT/US07/15652 dated Feb. 8, 2008.
Appendix B—SIP Diversion Header Implementation for Redirecting Number, pp. 1-10, Apr. 4, 2007.
Answering Service Industry News Blog—http://www.specialtyansweringservice.net/article13.shtml—Jun. 6, 2007.
SS7 Signaling Reference, Dec. 1999.
SS.7 Signaling Brochure (1 page), Jul. 2001.
Idea Solutions website printout—www.ideasolutions.it Nov. 17, 2006 (2 pages).
Integrated Services Digital Network (ISDN); Diversion supplementary services; Digital Subscriber Signaling System No. One (DSS1); Part 1: Protocol specification—ETSI EN 300 207-1 v3.1.1 (Jun. 2001); ETSI (60 pages).
Integrated Services Digital Network (ISDN); Call Forwarding Unconditional (CFU) supplementary service description ETS 300 200; Dec. 1994; ETSI (8 pages).
Virtual Secretary Brochure (1 page), Nov. 2007.
Digital cellular telecommunications system (Phase 2+); Call Forwarding (CF) Supplementary Services—Stage 1; (GSM 02.82 version 7.0.1 Release 1998); ETSI TS 100 515 v7.0.1 (Jul. 1999) ETSI (36 pages).
"SIP Diversion Header Implementation for Redirecting Number"—www.cisco.com/univercd/cc/td/doc/product/software/ios121/121rel/sipcfs/hennigan.htm—Apr. 6, 2007 (10 pages).
International Telecommunications Union; Series Q: Switching and Signalling; 1999 (42 pages).

SYSTEMS AND METHODS FOR PROVIDING ANSWERING SERVICES

RELATED APPLICATIONS

This application claims priority to and is a continuation-in-part of PCT application Ser. No. PCT/US2006/0267, filed Jul. 10, 2006, entitled "METHOD AND SYSTEM FOR MANAGEMENT AND ROUTING OF TELECOMMUNICATIONS ON DATA AND TELEPHONE LINES", which is hereby incorporated herein by reference in its entirety for all purposes. All benefit under 35 U.S.C. §120 for and to that application was and is hereby claimed. This application also claims priority to and is a continuation-in-part of U.S. patent application Ser. No. 11/652,319, entitled "METHOD AND SYSTEM FOR MANAGEMENT AND ROUTING OF TELECOMMUNICATIONS OF DATA AND TELEPHONE LINES," filed Jan. 11, 2007, which is also incorporated herein by reference in its entirety for all purposes.

FIELD OF INVENTION

The present invention relates to telecommunications systems, and more specifically to methods and systems for managing, routing, and responding to telecommunications data for multiple users.

BACKGROUND OF THE INVENTION

The continuous and explosive development of new computer and telecommunications technologies is very well known. For example, people use computers, telephones, and cellular phones daily in their work and/or daily life. As these technologies evolve, they begin to take on characteristics of one another. For example, the telephone is no longer, as in Meucci's time, a system that carries a voice from one end of the wire to another. Instead, it has become a multi-faceted apparatus capable of managing data as well as voice transmissions. As a result, telephones are now capable of connecting to the Internet, downloading e-mail, accessing chat rooms and so on. Some of the services that allow telephone users to better organize their work include call waiting, call transfer, call diversion, call forwarding, and call conferencing.

Figure 1:
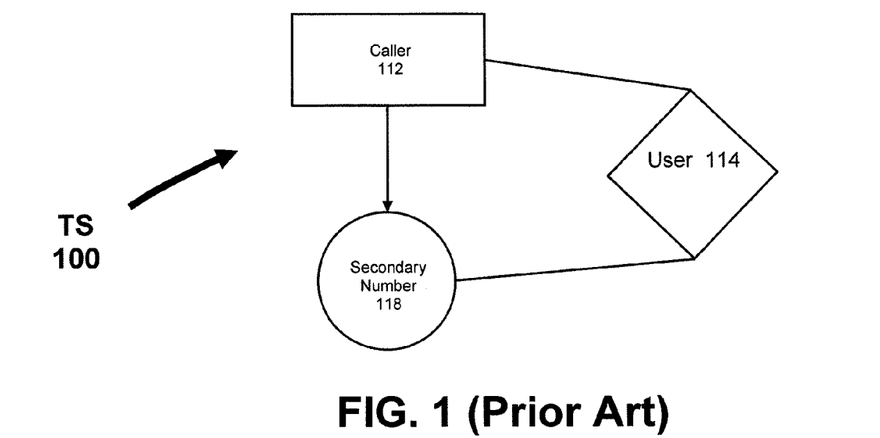
FIG. 1 illustrates a call-diversion telephone system in accordance with the prior art.

FIG. 1 is a block diagram of a prior art call-diversion telephone system (TS) 100. TS 100 typically includes one or more users 114 that communicate to a telephone company, though a fixed or portable telephone, an instruction to divert any incoming call from a caller 112 to a secondary number 118.

For example, during call diversion, the telephone company diverts incoming calls to user 114 to secondary telephone number 118. Accordingly, during call diversion, calls placed by incoming caller 112 to user 114 will be directly connected to derivative telephone 118, since the telephone company will have by-passed user 114.

The bi-passing of user 114 by the telephone company makes it difficult to provide on-line answering services. That is, by completely bi-passing user 114, the person answering derivative telephone number 118 may not have adequate information to properly respond to caller 112.

Figure 2:
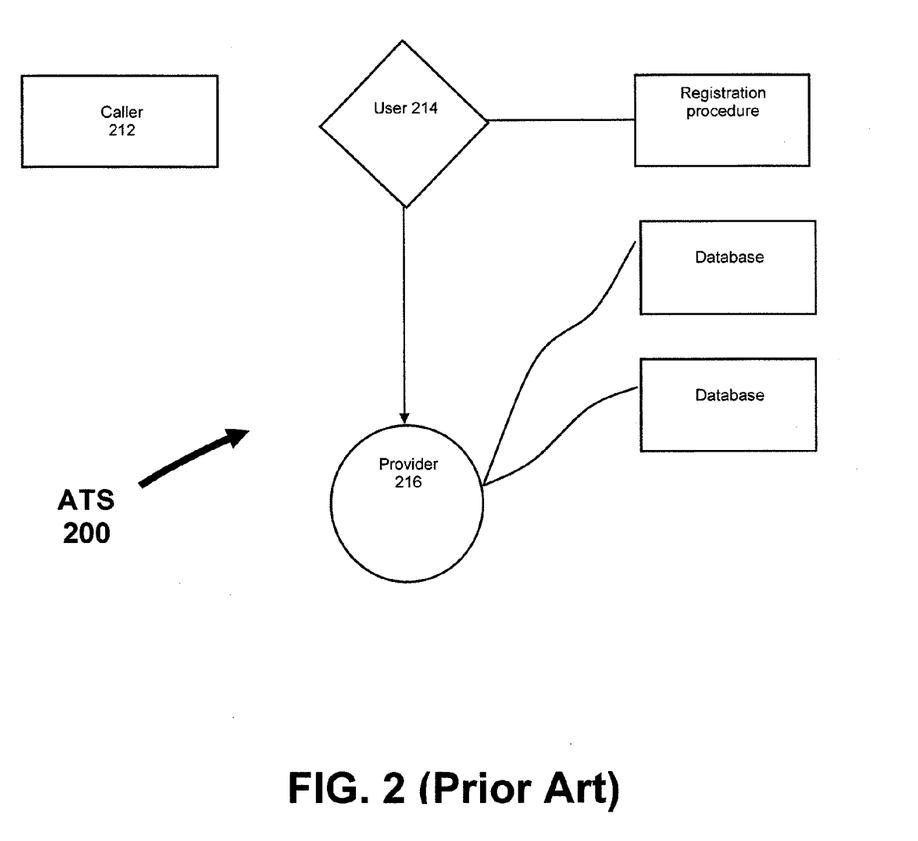
FIG. 2 illustrates a, advanced telephone system in accordance with the prior art.

Accordingly, more advanced answering services are available in the prior art. FIG. 2 further illustrates the answering services available with prior art systems. For example, advanced telephone system (ATS) 200, provides a user 214 with the ability to request a telephone answering service from a provider 216. User 214 then proceeds to register for the service with 216 by means of creating an account.

During registration, user 214 is assigned one or more exclusive telephone numbers to which each user may transfer their incoming calls. Each user must be assigned an exclusive telephone number to which their calls will be forwarded. However, it is difficult for provider 216 and/or user 214 to predict the total number of telephone numbers needed. Moreover, as provider 216 provides services to more and more users 214, provider 216 will need even more telephone numbers to accommodate them. Currently many providers 216 request more telephone numbers than initially needed in order to provide for additional users 214. That is, a provider 216 may request 999 phone numbers, while provider 216 only has four hundred users 214. Moreover, upon customer turnover, provider 216 often cannot reassign the previous customer's numbers because of the confusion and problems caused by such reassignment. In addition, providers 216 often do not have adequate information about users 214 or the incoming callers when answering calls on behalf of users 214. Accordingly, there is a need for a service that provides on-line answering services that does not necessarily require a unique telephone number to which each user 214 must forward their calls. In addition, there is a need for a service that provides on-line, live, and/or voice messaging answering services that are uniquely responsive to the identity of each user 214 and the information provided by them.

SUMMARY OF THE INVENTION

Accordingly, the present invention includes a method and system for the management and routing of telecommunications information on data and telephone lines. In one exemplary embodiment in accordance with the present invention, a flexible system whereby business information is correlated to a user's telephone number is provided. In another exemplary embodiment, the present invention provides an on-line answering service in which the identification information of a caller, the user, and the sub-user can be maintained during call forwarding and/or diversion such that it is not necessary to provide an exclusive telephone number for each user and sub-user. In another exemplary embodiment, the telephone number of the user called can be detected by the answering service, which can be used to access the business information of the user and respond to the call accordingly. In addition, in another exemplary embodiment, the present invention provides answering services access to information about the called party as well as the calling party in order to facilitate the answering services' responses on behalf of their users.

BRIEF DESCRIPTION OF THE DRAWINGS

The subject matter of the invention is particularly pointed out in the concluding portion of the specification. The invention, however, both as to organization and method of operation, can best be understood by reference to the following description taken in conjunction with the accompanying drawing figures, in which like parts can be referred to by like numerals.

Skilled artisans will appreciate that elements in the figures are illustrated for simplicity and clarity and have not necessarily been drawn to scale. For example, the dimensions of some of the elements in the figures can be exaggerated relative to other elements to help to improve understanding of embodiments of the present invention.

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments can be realized and that logical and mechanical changes can be made without departing from the spirit and scope of the invention. Thus, the detailed description herein is presented for purposes of illustration only and not of limitation. For example, the steps recited in any of the method descriptions can be executed in any order and are not limited to the order presented.

For the sake of brevity, conventional data networking, application development and other functional aspects of the systems (and components of the individual operating components of the systems) can not be described in detail herein. Furthermore, the connecting lines shown in the various figures contained herein are intended to represent exemplary functional relationships and/or physical couplings between the various elements. It should be noted that many alternative and/or additional functional relationships and/or physical connections can be present in a practical system.

The various system computing components discussed herein can include one and/or more of the following: a host server and/or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, the computing systems can include an operating system (e.g., MVS, Windows NT, 95/98/2000/XP/Vista, OS2, UNIX, MVS, TPF, Linux, Solaris, MacOS, AIX, etc.) as well as various conventional support software and drivers typically associated with computers.

The present invention can be described herein in terms of functional block components, screen shots, optional selections and various processing steps. It should be appreciated that such functional blocks can be realized by any number of hardware and/or software components configured to perform the specified functions. For example, the present invention can employ various integrated circuit components (e.g., memory elements, processing elements, logic elements, look-up tables, and the like), which can carry out a variety of functions under the control of one and/or more microprocessors and/or other control devices. Similarly, the software elements of the present invention can be implemented with any programming and/or scripting language such as C, C++, Java, COBOL, assembler, PERL, Visual Basic, SQL Stored Procedures, extensible markup language (XML), with the various algorithms being implemented with any combination of data structures, objects, processes, routines and/or other programming elements. Further, it should be noted that the present invention can employ any number of conventional techniques for data transmission, signaling, data processing, network control, and the like.

As will be appreciated by one of ordinary skill in the art, the present invention can be embodied as a method, a data processing system, a device for data processing, and/or a computer program product. Accordingly, the present invention can take the form of an entirely software embodiment, an entirely hardware embodiment, and/or an embodiment combining aspects of both software and hardware. Furthermore, the present invention can take the form of a computer program product on a computer-readable storage medium having computer-readable program code means embodied in the storage medium. Any suitable computer-readable storage medium can be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions can be loaded onto a general purpose computer, special purpose computer, and/or other programmable data processing apparatus to produce a machine, such that the instructions that execute on the computer and/or other programmable data processing apparatus create means for implementing the functions specified in the flowchart block and/or blocks.

These computer program instructions can also be stored in a computer-readable memory that can direct a computer and/or other programmable data processing apparatus to function in a particular manner, such that the instructions stored in the computer-readable memory produce an article of manufacture including instruction means which implement the function specified in the flowchart block and/or blocks. The computer program instructions can also be loaded onto a computer and/or other programmable data processing apparatus to cause a series of operational steps to be performed on the computer and/or other programmable apparatus to produce a computer-implemented process such that the instructions which execute on the computer and/or other programmable apparatus provide steps for implementing the functions specified in the flowchart block and/or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions and/ or steps, and/or suitable combinations of special purpose hardware and computer instructions.

As used herein, the term network can include any electronic communications means which incorporates both hardware and software components of such. Communication among the components and/or parties in accordance with the present invention can be accomplished through any suitable communication channels, such as, for example, a telephone network, an extranet, an intranet, Internet, point-of-interaction device (point-of-sale device, personal digital assistant, cellular phone, kiosk, Automatic Teller Machine (ATM), etc.), online communications, off-line communications, wireless communications, transponder communications, local area network (LAN), wide area network (WAN), networked and/or linked devices and/or the like. With respect to telephone networks, communication among the components and/or parties in accordance with the present invention can be accomplished through any type of telephone network, including, but not limited to, PSTN, ISDN, GSM, UMTS, GPRS, VOIP, and/or any video telephone networks or the like. Moreover, the invention can be implemented using communications protocols, IPX, Appletalk, IP-6, NetBIOS, OSI, TCP/IP, ATM, SS7, DSS1, SIP, H323 and/or any number of existing and/or future protocols. If the network is in the nature of a public network, such as the Internet, it can be advantageous to presume the network to be insecure and open to eavesdroppers. Specific information related to the protocols, standards, and application software utilized in connection with the Internet is generally known to those skilled in the art and, as such, need not be detailed herein.

Figure 3:
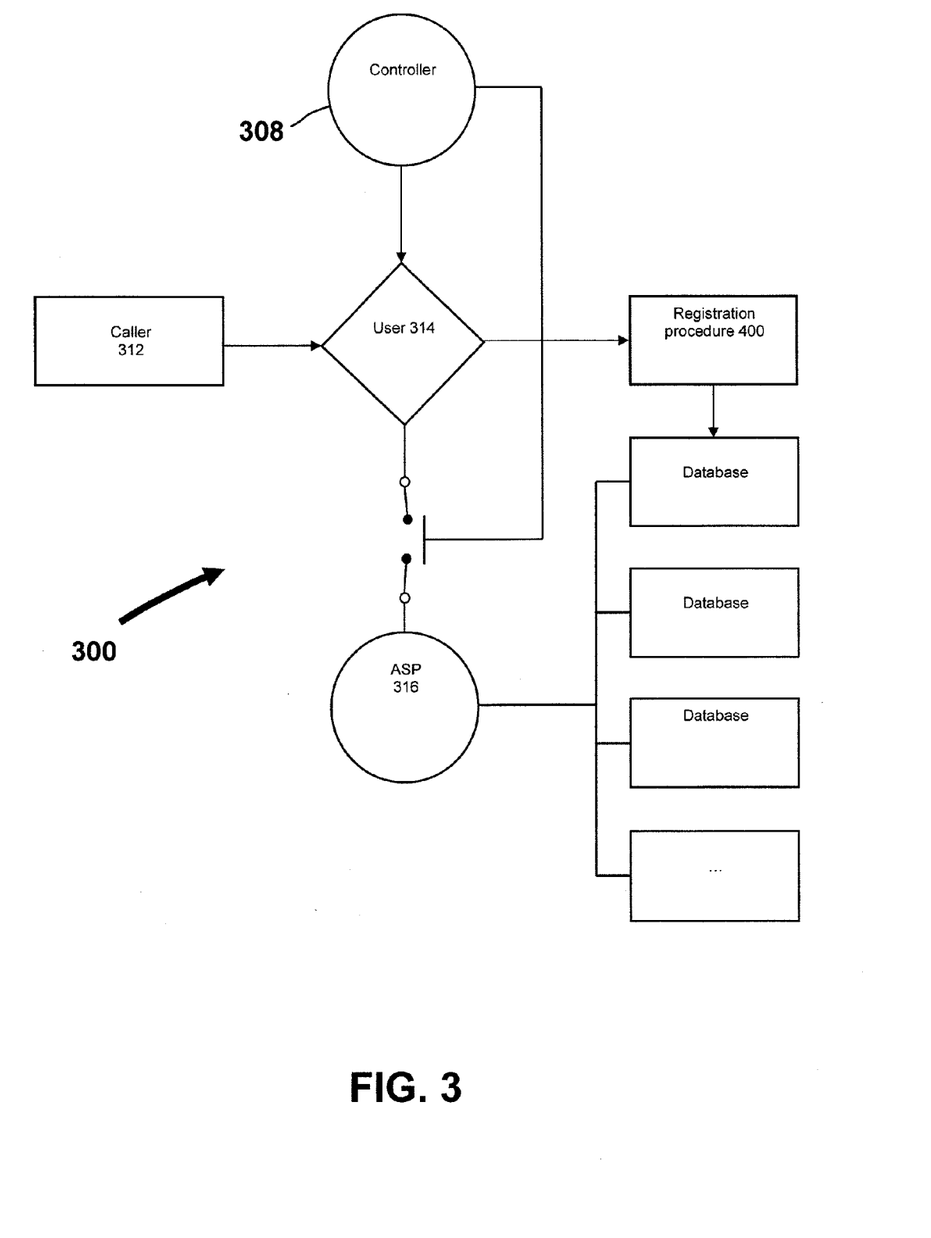
FIG. 3 illustrates a block diagram of an exemplary telephone answering service in accordance with an exemplary embodiment of the present invention.

FIG. 3 illustrates a block diagram of an exemplary telephone answering service (TAS) 300 in accordance with an exemplary embodiment of the present invention. TAS 300 comprises an answering service provider (ASP) 316 configured for facilitating answering services for one or more users 314. ASP 316 is configured to communicate with one or more controllers 308, described in detail herein. ASP 316 can communicate with controller 308 via a network, a telephone line, a fiber optics line, radio-frequency, blue tooth, and the like. Controller 308 facilitates communication between one or more callers 312 and users 314. In the case of telephony, it is understood by those skilled in the art that controller 308 can include, but is not limited to, the hardware and software associated with telecommunications and internet switches and routers, such as those from Cisco, Nortel, Lucent, Siemens, and the like.

As used herein, the phrase "answering services" includes management of telephone data and information, including, but not limited to call waiting, call transferring, call diversion, call forwarding, three-way calling, multi-party conferencing, and the like. For example, in one exemplary embodiment in accordance with the present invention, ASP 316 is configured to store information about user 314 and information for user 314 on one or more ASP 316 databases.

User 314 can be any type of user, such as, for example, a private user, a mail-order business, a customer service center, a user of a toll-free number, a user of an informational line, a business, a government entity, and the like. In addition, user 314 can comprise one or more telephonic device, such as, for example, a cellular phone, a standard telephone, a switchboard, a computer and the like. User 314 can gain access to ASP 316 by registering with ASP 316. By registering, user 314 of TAS 300 contacts ASP 316 and provides ASP 316 with business information. User 314 can also compromise multiple sub-users, such as, for example, individual employees of the user 314.

ASP 316 can include one or more computers or computing systems, a local database, a remote database, a portable storage device, an employer, a financial institution, a non-financial institution, a company, the military, the government, a school, a travel entity, a transportation authority, a security company, and/or any other system or entity that is authorized to receive and store user identifying information and associate the identifying information with user 314. While ASP 316 is described herein as providing answering services for user 314, ASP 316 can be configured to provide any type of service to user 314, such as, for example, call forwarding, ticketing services, booking services, and the like.

The telephone lines described herein can include any type of telephony or data communications lines, for example, voice telephone lines, data lines, Internet networks, radio-frequency channels and/or the like. The telephone numbers described herein can include any type of telephone number or identification code, including an IP address, standard telephone number, cellular telephone number, voice-over IP (VOIP) numbers and/or the like.

Figure 4:
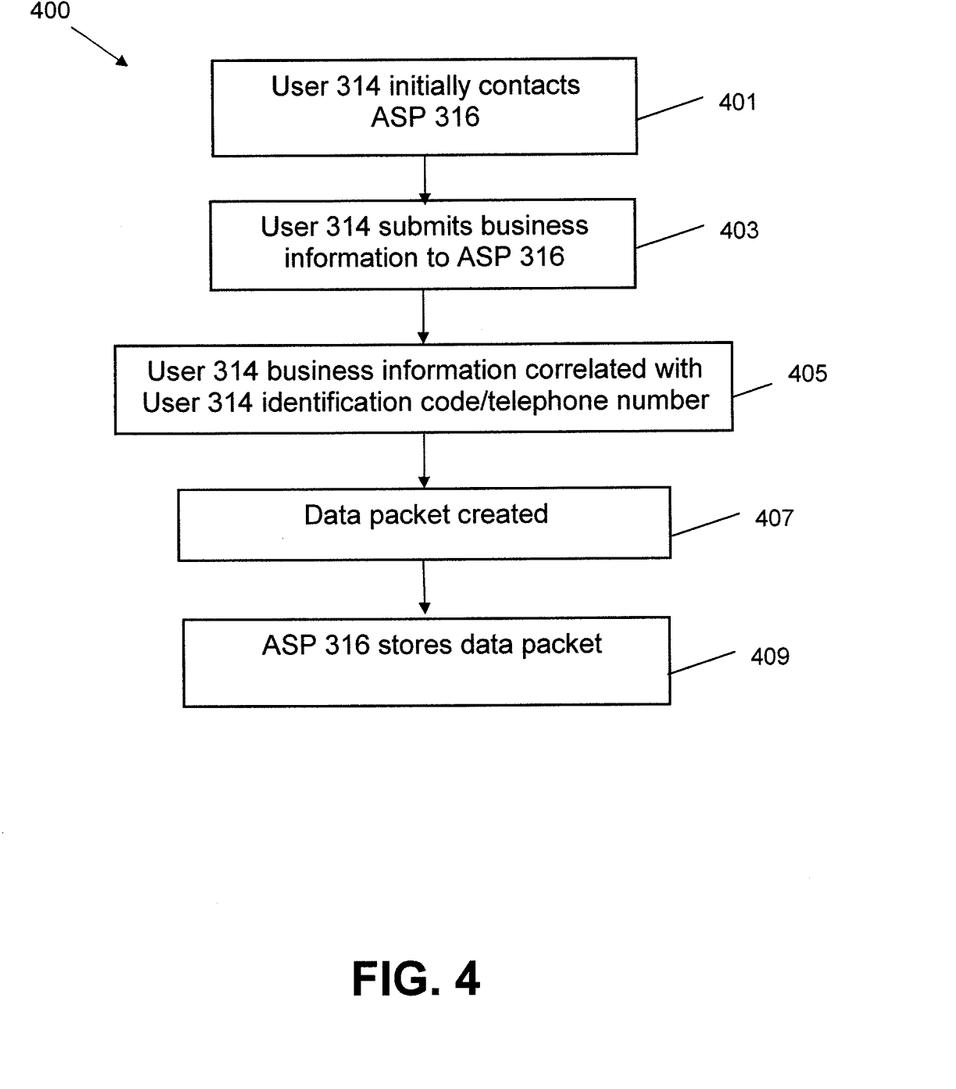
FIG. 4 illustrates an exemplary registration procedure in accordance with an exemplary embodiment of the present invention.

FIG. 4 illustrates an exemplary registration procedure 400 in accordance with an exemplary embodiment of the present invention. During registration, user 314 can contact ASP 316 (step 401) to submit business information to ASP 316 (step 403). User 314 can contact ASP 316 and submit business information in person, through a computer and/or Internet, through software and/or hardware, through a third-party, through a kiosk and/or registration terminal, and/or by any other direct or indirect means, communication device or interface for user 314 to contact ASP 316.

As used herein, business information can include information regarding the business and/or services of user 314, such as, for example, telephone numbers, business hours, accounting procedures, internal business information, general business information such as maps, hotels, ticketing, booking and/or reservation information, the number of sub-users, and/or sub-user information of user 314 and/or any other type of business information. For example, business information may also include the manner in which user 314 would like its phone calls answered at particular times and days, the type of music, recorded information, or radio the user 314 would like to be played while a caller is on hold; lists of callers (and/or phone numbers of callers) to which ASP 316 should always attempt to directly connect user 314, never attempt to directly connect user 314, or attempt to directly connect user 314 during regular business hours; the information which user 314 would like to be included in messages taken from callers who are not connected to user 314; the manner by which user 314 would like to be notified of messages (such as, for example, telephone, pager, facsimile, SMS, MMS, voice-mail, text message, email, internet website posting, etc.); information which user 314 would ordinarily provide to certain types of callers (such as, for example, locations, business hours, account information, service availability, etc.); the manner in which user 314 expects to be billed for answering services (such as, for example, invoice, credit card, automatic account debit, wire transfer, etc.); and when and under what conditions (such as, for example, the identity of the caller) user 314 would like its calls forwarded or diverted to ASP 316. User 314 can review and/or modify the business information submitted to ASP 316 at any time. For example, in one embodiment, the business information of user 314 is submitted and available through a computer and/or Internet webpage, such that user 314 can directly trigger or turn on the service, review and/or modify the business information in real time and in a convenient manner. The manner in which user 314 would like its phone call to be answered may include a script for the operator of the ASP 316, music or other information to be played at the beginning of the call, or any other response to be directed by the ASP 316 to the caller.

Upon receiving the business information, ASP 316 and/or user 314 can correlate and/or register the business information and one or more user identification codes (step 405), such as, for example the telephone number and/or IP address that a telecommunications entity (i.e. AT&T, Verizon, etc.) has assigned to user 314 to create a data packet (step 407). For example, the identification code can be any number or code (i.e. a serial number, alphanumeric number, or other type of code), such as the telephone number of user 314, that is unique to each user 314 of TAS 300.

While FIG. 4 is described with respect to correlating the business information with one or more user identification codes generally, ASP 316 and/or user 314 can correlate the business information and/or identification code with the telephone number of user 314. As used herein, a data packet may include the information relating to at least one type of user information, business information, and/or any other information. After correlating the identification code with the data packet, ASP 316 can store the data packet in a database, digital format and/or any storage medium known in the art (step 409).

For example, ASP 316 is configured with one or more local, remote or other databases used for data packet storage and retrieval. The ASP databases can be a graphical, hierarchical, relational, object-oriented or other database. The databases are configured such that each data packet and can be suitably retrieved from the databases and provided to ASP 316 and/or user 314 using the identification code of user 314.

Figure 5:
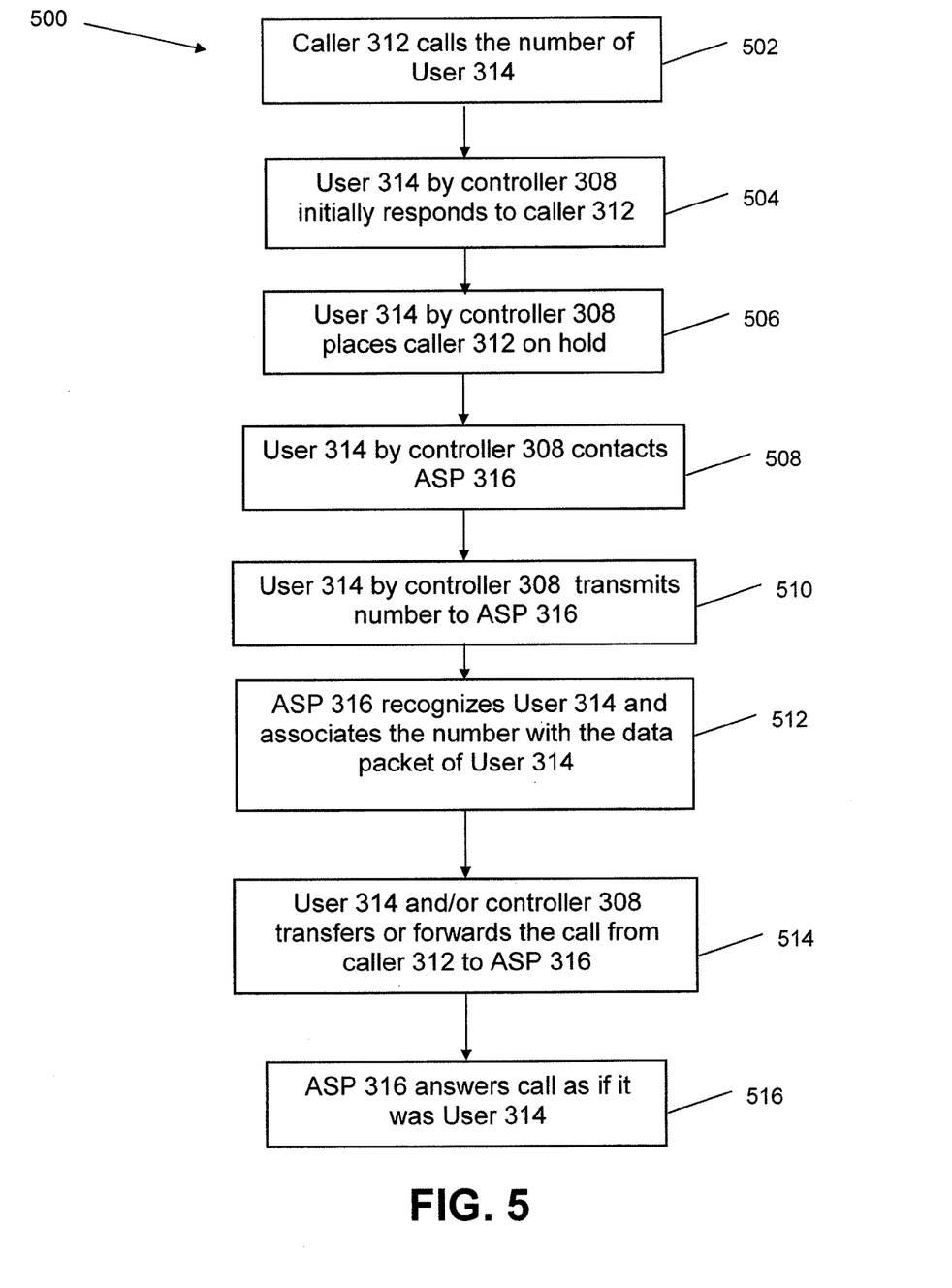
FIG. 5 illustrates an exemplary answering service method in accordance with an exemplary embodiment of the present invention.

With reference to another exemplary embodiment in accordance with the present invention, FIG. 5 illustrates an exemplary answering service method (ASM) 500, in which ASP 316 utilizes the identification code of user 314 to provide answering services. During ASM 500, user 314 receives one or more calls from caller 312 (step 502). User 314 can then provide a response to caller 312 (step 504). By providing a response to caller 312, user 314 can answer the call, provide a specific ring-back response, and/or any other type of response known in the art to caller 312. For example, in one embodiment, controller 308 can be configured to divert caller 312 from user 314 to ASP 316 immediately or after a certain number of rings. Controller 308 can also be configured at the direction of ASP 316 to divert caller 312 from user 314 to ASP 316 at certain times and/or for certain callers, depending on the business information submitted by user 314. Alternatively, user 314 can control directly when calls are diverted to ASP 316 by, for example, manual call forwarding or transfer, or by arranging for conditional or unconditional call forwarding or diversion with user ASP 315 or the telephony service provider of user 314.

Simultaneously or at a subsequent time, controller 308, acting on behalf of user 314, can place the call on hold and/or temporarily refrain from answering caller 312 (step 506). For example, user 314 and/or controller 308 can manually and/or electronically provide a response, place the call on hold, and/or otherwise refrain from answering the call from caller 312, which can be diverted to ASP 316. As such, user 314, in conjunction with ASP 316 and/or user 314's telephony service provider, can use one or more software and/or hardware protocols, systems and/or devices in order to facilitate steps 504 and 506.

For example, in one exemplary embodiment, user 314 uses controller 308 software to facilitate steps 504 and 506. That is, controller 308 can be configured to temporarily store information about caller 312 on one or more controller 308 databases upon receiving the call at user 314. Controller 308 databases may be configured similar to ASP 316 databases, described herein. Controller 308 can also be configured to provide a response to caller 312 and/or temporarily place caller 312 on hold. Alternatively and/or in addition, ASP 316 can receive the information regarding caller 312 from the signal accompanying the call, such as, for example, the setup message, the initial address message, or another signal that accompanies the call.

Simultaneously, or shortly thereafter, controller 308 and/or user 314 can be configured to contact ASP 316 and transfer the temporarily stored information about caller 312 to ASP 316 (step 508). Controller 308 and/or user 314 can also transmit the identification code associated with user 314 to ASP 316, in order to facilitate recognition of user 314 by ASP 316 (step 510). Alternatively and/or in addition, ASP 316 can receive the information code associated with user 314 from the signal accompanying the call. For example, when the information code is the same as the phone number from user 314, the information code may be either the original called number (the number originally dialed by the caller) or the redirecting number (the number that triggered the redirection of the call to the ASP 316). Both the original called number and the redirecting number are included, for example, in the initial address message and/or setup message included with the signal accompanying the call. The signal accompanying the call may also include other information related to the call that can be used by ASP 316 to respond to the call, including, for example, the calling party number, the calling party name, the charged party identification, any collect call request, any global call reference, any location number, any redirect counter, any redirection information, any subsequent number dialed, and/or any other information that can be included with the signal accompanying the call.

ASP 316 can comprise one or more telephone operators. The telephone operators could be physically located in a central location or remotely distributed geographically. Each incoming call diverted or transferred to ASP 316 can be distributed to an individual operator pursuant to certain criteria, such as, for example, language, location, or nationality of the caller, the operator who has not received a call for the longest period of time or the operator has received the least amount of calls in a given period. The ASP 316 can distribute the calls to the operators at the central location or can distribute the calls to the operators located remotely. The ASP 316 can select the operators for potential employment by allowing operator applicants to record a voice sample, a resume, a list of available equipment, and/or other qualifications on the website of the ASP 316 and enabling the ASP 316 to review said qualifications. The operators can be paid for their services on an hourly basis, a salaried basis, on the basis of the number of calls answered, or on the basis of the amount of time the operator is speaking to callers. The ASP 316 can pay the operators at the end of each period of time in which the operators work or on a regularized basis, such as biweekly, etc. The operators can input their working preferences, such as the times in which they are available to work and the manner and frequency in which they would prefer to be paid, on the Internet website of the ASP 316 or in another manner. The flexibility provided to the operators of ASP 316 and the ease in which the operators can input their preferences could encourage operators to work for ASP 316. The ASP 316 can be configured to automatically contact operators in the event that additional operators are needed to handle call load.

By transmitting information and/or a user 314 identification code to ASP 316, controller 308 and/or user 314 can use any communication method described herein. Upon receiving the call and/or transmission from controller 308 and/or user 314, ASP 316 can use the information and/or identification code to recognize user 314 from, for example, the original called number and/or the redirecting number, and can recognize other information associated with the call, including the identity of the caller. ASP 316 can then use the identification code of user 314 to access the data packet of user 314 stored on one or more ASP 316 databases (step 512). Simultaneously, prior to, and/or afterwards, controller 308 and/or user 314 can transfer or divert the call from caller 312 to ASP 316 (step 514). Upon transfer or diversion of the call from user 314 to ASP 316, ASP 316 can answer the call and use information from the data packet to respond to caller 312 as if ASP 316 was user 314 (step 516).

In particular, the information from the data packet can be displayed to ASP 316 on an electronic display, and ASP 316 can use the business information provided by user 314 to answer the call. For example, ASP 316 can answer the call from caller 312 in the manner directed by user 314. The manner in which ASP 316 answers the call may include ASP 316 greeting caller 312 by name based upon caller identity information included in the signal accompanying the call. ASP 316 can consult the lists of callers to determine whether caller 312 is a caller for which ASP 316 should always attempt to directly connect to user 314, never attempt to directly connect user 314, or attempt to directly connect user 314 during regular business hours. ASP 316 can then follow the directions, if any, provided by user 314 with respect to caller 312. If caller 312 is not directly connected to user 314, then ASP 316 can provide caller 312 with any information user 314 has instructed should be provided to caller 312 or take down information in a message from caller 312 in the manner directed by user 314. ASP 316 can provide information about the call to user 314, including the identity of caller 312, any information provided to caller 312, and/or the message from caller 312 in the manner by which user 314 indicated it would like to be notified of messages. ASP 316 can then or subsequently bill user 314 for the call depending on the nature of the answering service provided and in the manner in which user 314 has indicated that it expects to be billed for the answering services. ASP 316 may either answer and/or respond to the calls utilizing a live operator or by utilizing a computerized system.

ASM 500 could be configured to immediately divert or redirect the call from caller 312 to ASP 316. In such a case, the controller 308 could be configured to identify information regarding the telephone number or identification code of the user 314 or sub-user to which the call was originally directed. This information could include the original called number and/or the redirecting number, which may be provided in the signal accompany the redirected call from caller 312. ASP 316 need only have one telephone number to which calls are diverted. All calls directed to all of the users 314 and sub-users for ASP 316 could be transferred, diverted, and/or redirected to a single phone number for ASP 316. In such a system, ASP 316 could determine how to answer caller 312 based on the identification code or telephone number of user 314 or its sub-users and the business information provided by user 314 or its sub-users. ASP 316 could then answer caller 312 on behalf of user 314 or its sub-users using that business information as described above.

With reference again to the exemplary embodiment depicted in FIG. 3, controller 308 can be configured with one or more hardware and/or software protocols, systems, routines, and the like. For example, in one exemplary embodiment, controller 308 comprises software that is installed and/or communicates with the telephone device of user 314, which instructs the telephonic device of user 314 to divert an incoming call. In another exemplary embodiment, user 314 can bypass controller 308 and manually determine whether to answer or divert incoming call 312 to ASP 316.

In one exemplary embodiment in accordance with the present invention, controller 308 is associated with ASP 316 to facilitate transfer and management of telephone communications and data. For example, controller 308 and ASP 316 can be configured with a call answering processor, call transferring processor, and the like. For example, the number and/or identification code of user 314 can be associated with the answering processor and/or call transfer processor to facilitate transfer by controller 308 and call answer by ASP 316.

ASP 316 can be configured to respond and/or answer to an incoming call from caller 312. By responding and/or answering the call, ASP 316 can provide a vocal response, a ringback response, place the call on hold, and/or answer or respond in a manner that is undetectable and/or detectable by caller 312 that the assigned operator of ASP 316 is a third party. In addition, controller 308 can be configured to associate the identification code of user 314 with the call from caller 312 to from associated information. Controller 308 can also be configured to transfer the identification code of user 314, the associated information and/or business information of user 314 to ASP 316, and/or perform any other transfer and/or transmission process.

Controller 308 can also be configured to be connected directly and/or through a network to ASP 316. For example, controller 308 can be connected to one or more answering components of ASP 316, one or more call switching components of ASP 316 and/or one or more third party switching components. Controller 308 is configured to recognize the identification code of user 314 and to facilitate the association of the number and/or identification code with the user 314 data packet stored on one or more databases of ASP 316.

Figure 6:
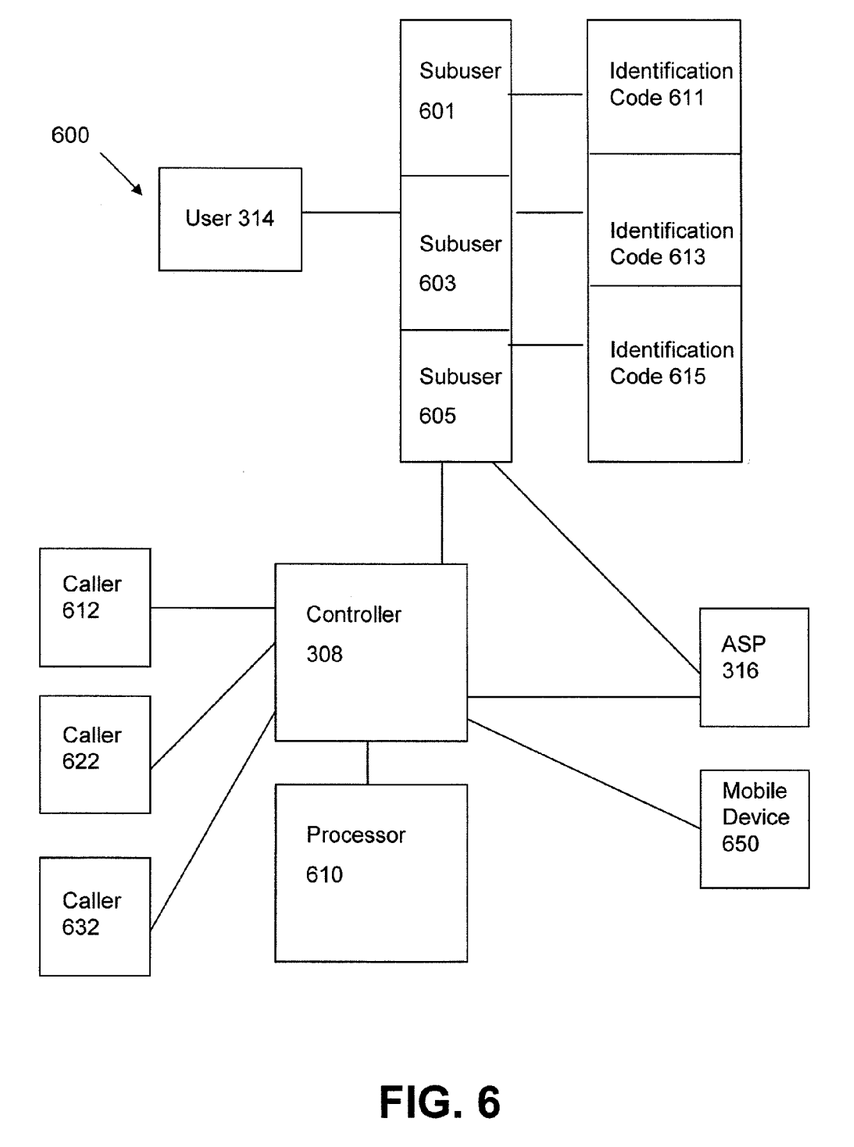
FIG. 6 illustrates a block diagram of an exemplary call routing system in accordance with an exemplary embodiment of the present invention.

In accordance with an exemplary, more advanced embodiment of the present invention as illustrated in FIG. 6, controller 308 can comprise a processor 610 that can be used to facilitate a call routing system 600. Call routing system 600 can be configured with a processor 610 for assigning answering criteria for different sub-users 601, 603, 605 of user 314. For example, each sub-user 601, 603, 605 is assigned a different number and/or identification code 611, 613, 615. These numbers and/or identification codes 611, 613, 615 are associated with one or more user 314 data packets and or sub-user 601, 603, 605 data packets stored on ASP 316.

Processor 610 and/or ASP 316 can use different identification codes 611, 613, 615 to facilitate call management and distribution. For example, when multiple incoming calls from callers 612, 622, 632 are placed to sub-users 601, 603, 605 of user 314, processor 610 and/or ASP 316 can use identification codes 611, 613, 615 to prioritize the call answering by ASP 316. For example, processor 610 and/or ASP 316 can be configured to route all incoming calls to sub-user 601 with identification code 611 to ASP 316 between the hours of 8 a.m. and 12 p.m., and then to mobile device 650 from 12 p.m. to 5 p.m. While three sub-users 601, 603, 605, three callers 612, 622, 632 and three identification codes 611, 613, 615 are illustrated in exemplary FIG. 6, the present invention contemplates the use of any number of users, sub-users, callers, numbers and/or identification codes.

In order to facilitate call management in accordance with one exemplary embodiment of the present invention, the various telecommunications devices of users 601, 603, 605 and/or ASP 316 can be configured to facilitate call routing. For example, the various telecommunications devices can be configured to use a routing program to route calls based on the sub-user 601, 603, 605 identification codes, as described above. In addition, the telecommunications devices of sub-users 601, 603, 605 can be used to facilitate transfer of calls from callers 612, 622, 632 to ASP 316 using a routing program and/or the identification codes of sub-users 601, 603, 605. For example, in one exemplary embodiment in accordance with the present invention, ASP 316 and/or the telecommunications devices of sub-users 601, 603, 605 can receive identification code 611 and can correspond this code with sub-user 601, user 314 and/or caller 612.

Accordingly, ASP 316 only needs one telephone number to which multiple users 314 or sub-users 601, 603, 605 can forward or divert their calls. ASP 316 can answer the forwarded or diverted call on behalf of the user 314 or sub-user 601, 603, 605 by detecting the telephone number called and from which the call was forwarded or diverted and accessing the business information associated with that telephone number in order to provide answering services on behalf of the user 314 or sub-user 601, 603, 605 as described above. For example, in one exemplary embodiment in accordance with the present invention, during user 314 registration, ASP 316 and/or user 314 may correlate one or more sub-users 601, 603, 605 with the user 314 identification code. In another embodiment, ASP 316 and/or user 314 may correlate a different level of service with each sub-user 601, 603, 605.

Figure 7:
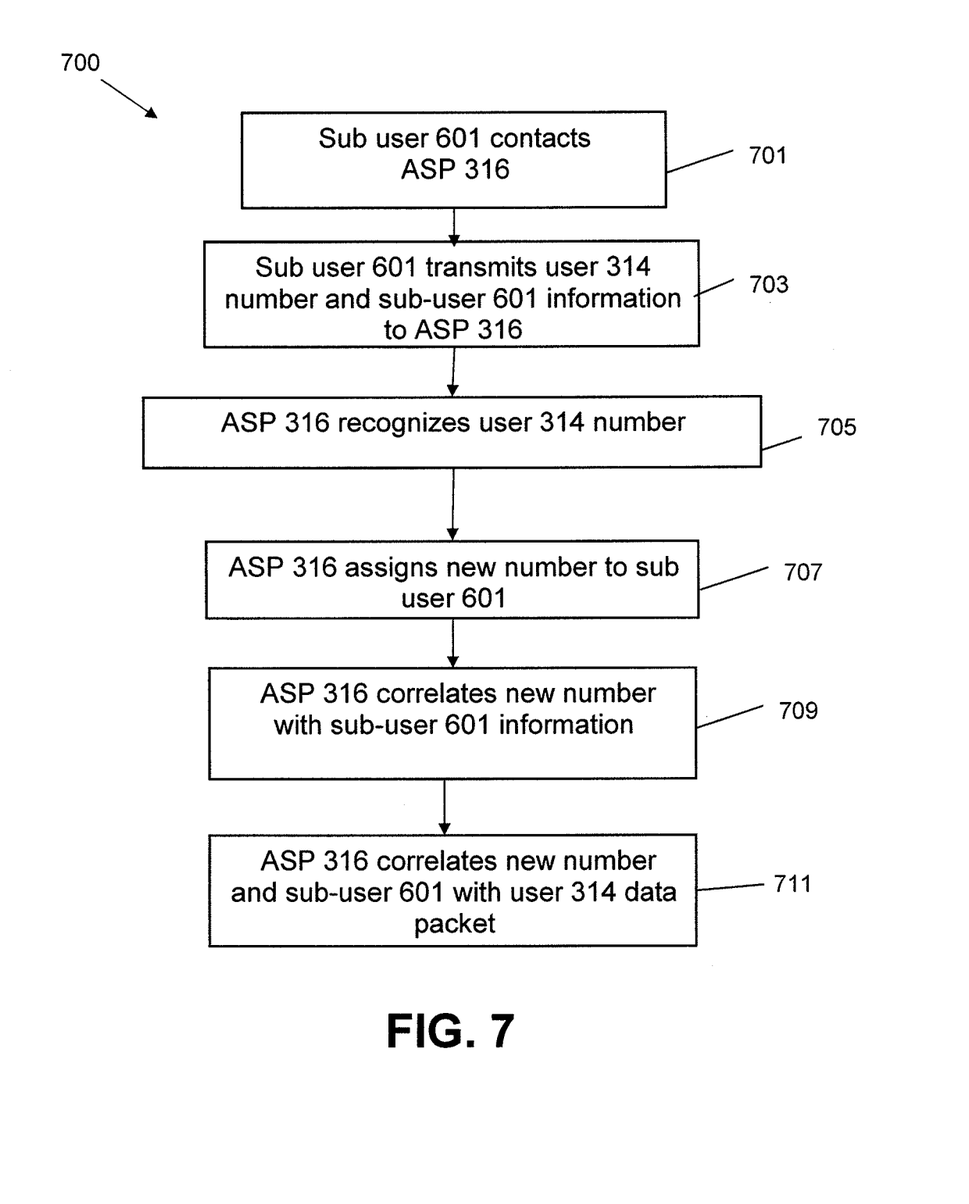
FIG. 7 illustrates an exemplary sub-user registration method in accordance with an exemplary embodiment of the present invention.

In yet another exemplary advanced embodiment in accordance with the present invention, as more sub-users are added to the account of user 314, each sub-user can undergo a registration procedure, similar to the one outlined in FIG. 4. For example, an exemplary sub-user registration method 700 is illustrated in FIG. 7. During sub-user registration, sub-user 601 contacts ASP 316 (step 701). Sub-user 601 may contact ASP 316 because sub-user 601 was not previously registered with ASP 316, because sub-user 601 may want to alter or change its previous registration information, and/or for any other reason relating to sub-user registration. Upon and/or after contacting ASP 316, sub-user 601 can transmit a user 314 identification code and/or sub-user 601 information to ASP 316 (step 703). The user 314 identification code can be used to recognize user 314 information (step 705) and/or to locate the data packet associated with user 314.

Upon recognizing and/or locating user 314 information, ASP 316 can assign a new identification code to sub-user 601 (step 707) and can correlate the new identification code with the user 314 data packet, the sub-user information and/or the user 314 identification code (step 709, step 711). Accordingly, depending on the preference of user 314 and/or sub-user 601, the information of each sub-user 601 can be correlated directly with the user 314 identification code and/or the user 314 data packet.

The association of sub-user 601 information with the user 314 data packet facilitates flexibility with respect to ASP answering services. For example, in an exemplary embodiment of the present invention, ASP 316 can be configured to facilitate call-diversion, call-forwarding, and/or any other type of answering service for user 314 and/or sub-users 601, 603, 605. That is, if a user and/or sub-users requests ASP 316 answering services, one or more human or mechanical operators of ASP 316 can receive one or more identification codes of user 314 and/or sub-users 601, 603, 605 whenever a call is placed to any of user 314 or sub-users 601, 603, 605. These identification codes, in turn, may be used by ASP 316 to instantaneously access one or more data packets associated with user 314 and/or sub-users 601, 603, 605.

More specifically, and with reference again to FIG. 6, ASP 316 can also be configured to recognize which user 314 and/or sub-user 601, 603, 605 each caller 612, 622, 632 is attempting to reach by recognizing, for example, the original called number or the redirecting number included with the signal associated with the call. That is, ASP 316 can use the user 314 identification code or sub-user identification codes 611, 613, 615 associated with a call to accurately access the relevant data packet information of user 314 and/or sub-user 601, 603, 605. For example, if caller 612 is attempting to call sub-user 601, the call contains identification code 611 that is associated with sub-user 601. This identification code 611 can be forwarded to ASP 316, and ASP 316 can use identification code 611 to access the sub-user 601 information stored in an ASP 316 data packet. ASP 316 can then use this sub-user 601 information to respond to caller 612 in an informed manner, as if ASP 316 was sub-user 601 and provide answering services consistent with business information provided by either user 314 or sub-user 601.

In particular, the information from the data packet associated with either user 314, sub-user 601, or both can be displayed to ASP 316 on an electronic display, and ASP 316 can use the business information contained within said data packets to answer the call. For example, ASP 316 can answer the call from caller 612 in the manner directed by user 314 and/or sub-user 601. The manner in which ASP 316 answers the call may include ASP 316 greeting caller 612 by name based upon caller identity information included in the signal accompanying the call. ASP 316 can consult the lists of callers to determine whether caller 612 is a caller for which ASP 316 should always attempt to directly connect to user 314 and/or sub-user 601, never attempt to directly connect user 314 and/or sub-user 601, or attempt to directly connect user 314 and/or sub-user 601 during regular business hours. ASP 316 can then follow the directions, if any, provided by user 314 and/or sub-user 601 with respect to caller 612. If caller 612 is not directly connected to user 314 and/or sub-user 601, then ASP 316 can provide caller 612 with any information user 314 and/or sub-user 601 has instructed should be provided to caller 612 or take down information in a message from caller 312 in the manner directed by user 314 and/or sub-user 601. ASP 316 can provide information about the call to user 314 and/or sub-user 601, including the identity of caller 612, any information provided to caller 612, and/or the message from caller 612 in the manner by which user 314 and/or sub-user 601 indicated they would like to be notified of messages. ASP 316 can then or subsequently bill user 314 and/or sub-user 601 for the call depending on the nature of the answering service provided and in the manner in which user 314 and/or sub-user 601 has indicated that it expects to be billed for the answering services. To the extent there are any conflicts between the business information provided by user 314 and its sub-user 601, ASP 316 can be directed to resolve the conflict and answer based on the business information provided by user 314 or sub-user 601 depending on the nature of the business information. Further, the business information displayed by ASP 316 may depend upon when the call is received, depending on the instructions of user 314 and/or sub-user 601.

Figure 8:
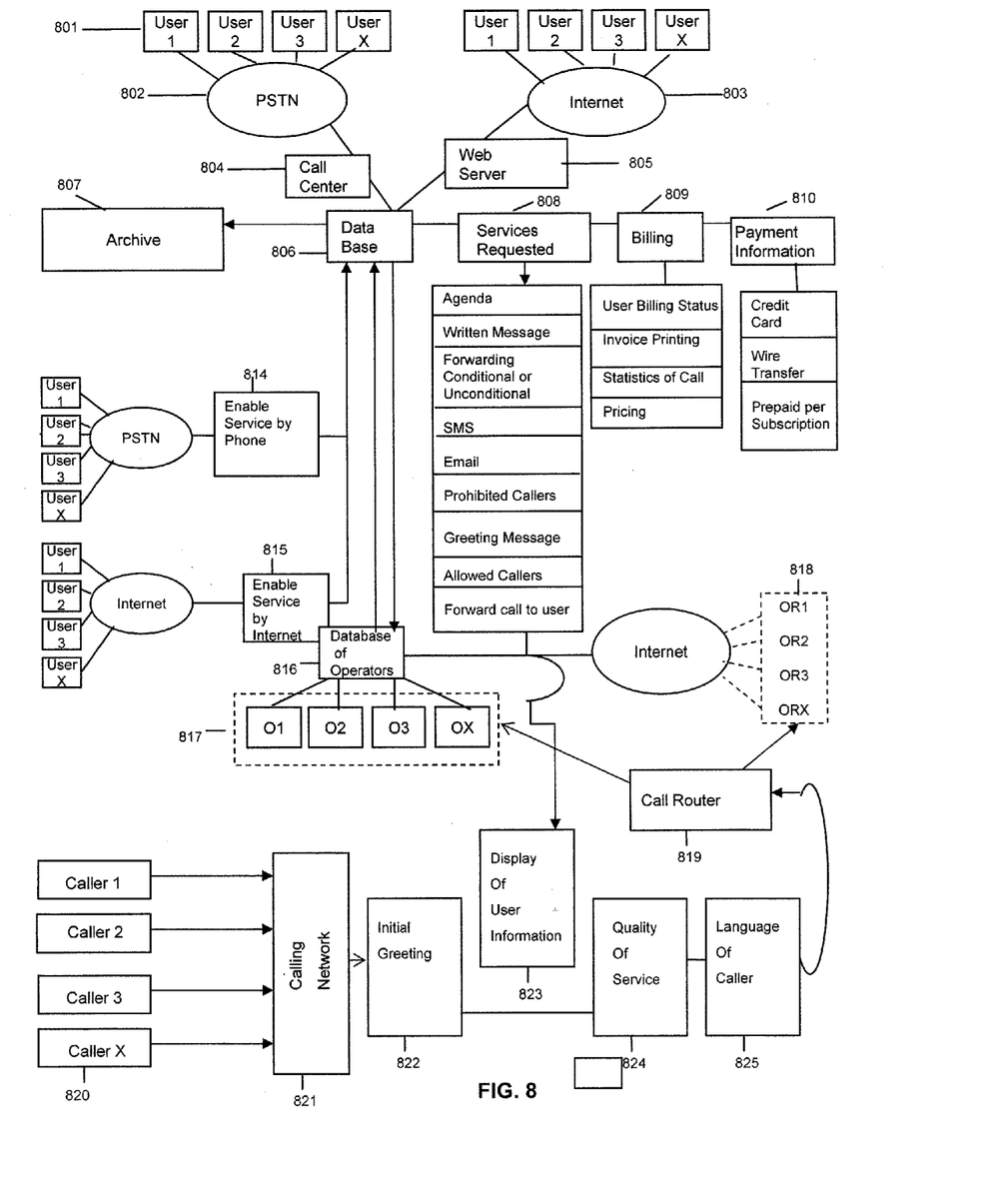
FIG. 8 illustrates an exemplary system for providing services in accordance with an exemplary embodiment of the present invention.

In yet another exemplary embodiment in accordance with the present invention, the ASP 316 can provide services as illustrated in FIG. 8. One or more users 801 can register with ASP 316 and provide their business information to ASP 316 either through a public switched telephone network (PSTN) 802, the Internet 803, and/or any other network described herein to a Call Center 804 or a Web Server 805, respectively. The business information of each user 801 can be stored in a Database 806, which can be backed up in an Archive 807. The business information of user 801 may include information about the Services Requested 808, Billing Information 809, Payment Information 810, and/or any other information as described above.

ASP 316 can be configured to facilitate user 801 in choosing to Enable Service by Phone 814, Enable Service by Internet 815 and/or to choose any other answering services that user 801 desires to be provided. User 801 information can then be stored in Database 806 and/or associated with ASP 316. Database 806 can be configured in a manner similar to any other database described herein. When one or more callers 820 place a call that is forwarded or redirected by the Calling Network 821 to the ASP 316, ASP 316 may first present caller 820 with an Initial Greeting 822. ASP 316 may then determine the original called number, the redirecting number, and/or any other identification number associated with one of the users 801. Based on that information, as well as the identity of caller 820, the Quality of Service 824 and/or the Language of the Caller 820, ASP 316 may then route the call using Call Router 819 to an Operator 817 (O1, O2, O3, Ox) and/or a Remote Operator 818 (OR1, OR2, OR3, ORx). ASP 316 can be configured to use criteria stored in database 806, or the Database of Operators 816 when routing calls in a manner as described above. Operator 817 and/or Remote Operator 818 may then answer the call using the business information of User 801, which can be shown to Operators 817, 818 in the Display of User Information 823.

The present invention has been described above with reference to various exemplary embodiments. However, those skilled in the art will recognize that changes in modifications can be made to the exemplary embodiments without departing from the scope of the present invention. As used herein, the terms "comprises," "comprising," and/or any other variation thereof, are intended to cover a non-exclusive inclusion, such that a process, method, article, and/or apparatus that comprises a list of elements does not include only those elements but can include other elements not expressly listed and/or inherent to such process, method, article, and/or apparatus. Further, no element described herein is required for the practice of the invention unless expressly described as "essential" and/or "critical."

What is claimed is:

1. A system for providing answering services, comprising:
    a controller inside a public network comprising circuit switched networks and/or packet switched networks, wherein the controller provides call information for an incoming call directed to a user, said call information included in a signal accompanying the incoming call, said signal including an original called number and a redirecting number associated with said user;
    an answering services provider that receives call information from the controller, the answering services provider including a telephone operator;
    an answering services provider database, wherein said answering services provider database associates and stores information of said user, said stored user information comprising the manner in which incoming calls to said user should be answered by said telephone operator and further comprising business information of the user;
    wherein said controller forwards said incoming call and said call information to said answering services provider, said forwarded call information including said original called number, said redirecting number, and further including redirection information relating to the forwarding of the incoming call;
    wherein the call information in the signal is detected by the answering services provider based upon the original called number and/or the redirecting number and without the need to provide, in advance of the incoming call, a unique telephone number or identification code to the user distinct from the original called number and the redirecting number; and
    wherein said answering services provider uses said call information to access said stored user information and instruct said telephone operator to answer the incoming call in a manner directed by said stored user information.

2. The system of claim 1, wherein said answering services provider receives said stored user information via Internet web services, wireless, radio channels, internet website, and/or application software upon registration of said user with said answering services provider.

3. The system of claim 2, wherein the stored information is used by the answering services provider to localize position and/or business information of the user and/or to manage instant messaging or VOIP.

4. The system of claim 3, wherein the stored information is managed using one or more of GIS, GPS, NMEA, TOA, E-OTD, CELL-ID, TA, OTDOA, WI-FI and A-GPS.

5. The system of claim 1, wherein said stored user information includes the manner in which said user wishes to be notified about a message left by a caller.

6. The system of claim 1, wherein said stored user information includes the manner in which said user would like calls directed to said user answered.

7. The system of claim 6, wherein said manner depends on the particular time at which said call is received.

8. The system of claim 1, wherein said stored user information includes a list of callers from which said answering services provider attempts to connect said user.

9. The system of claim 8, wherein whether or not said attempt is made by the answering services provider depends on the time at which said call is received.

10. The system of claim 1, wherein said business information comprises one or more of a telephone number(s) of the user, business hours of the user, address information of the business, internal business information, positioning, and/or real time location of the user.

11. The system of claim 1, wherein said stored user information is displayed on an electronic display used by said telephone operator.

12. The system of claim 11, wherein the stored user information displayed depends on at least one of: the time at which said call is received and identity of the caller.

13. The system of claim 1, wherein said call is a video telephone call.

14. The system of claim 1, wherein the signal is an initial address message, a setup message, or an invite message.

15. The system of claim 14, wherein the signal further comprises a global call reference, a location number, a calling geodetic location code, or positioning of the user.

16. The system of claim 1, wherein the network is a telephone network and/or an Internet network.

17. The system of claim 1, wherein the circuit switched network is selected from one or more of PSTN, ISDN, GSM, CDMA, UMTS, and LTE networks.

18. The system of claim 1, wherein the circuit switched network utilizes one or more of an SS7 communication protocol and a DSS1 communication protocol.

19. The system of claim 1, wherein the packet switched network utilizes one or more VOIP protocols.

20. The system of claim 19, wherein the VOIP protocol(s) utilizes one or more of an SIP communication protocol, an H323 communication protocol, a SCCP communication protocol, a MEGACO communication protocol, an MGCP communication protocol, and a TCP/IP communication protocol, and a IAX communication protocol.

* * * * *